United States Patent
Chandler et al.

(10) Patent No.: US 10,703,304 B2
(45) Date of Patent: Jul. 7, 2020

(54) THERMAL ENCAPSULATION APPARATUS

(71) Applicant: JAGUAR LAND ROVER LIMITED, Warwickshire (GB)

(72) Inventors: Paul Chandler, Coventry (GB); Benedict Wicksteed, Coventry (GB); Dean Petley, Coventry (GB); Gery Fossaert, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 104 days.

(21) Appl. No.: 15/972,417

(22) Filed: May 7, 2018

(65) Prior Publication Data
US 2018/0319353 A1 Nov. 8, 2018

(30) Foreign Application Priority Data
May 8, 2017 (GB) .................................. 1707318.0

(51) Int. Cl.
*B60R 13/08* (2006.01)
(52) U.S. Cl.
CPC ...... *B60R 13/0861* (2013.01); *B60R 13/0838* (2013.01); *B60R 13/0876* (2013.01)
(58) Field of Classification Search
CPC ............ B60R 13/0838; B60R 13/0861; B60R 13/0876; B60R 13/0884; F02B 77/11; F02B 77/13
USPC ........................................................ 296/39.3
See application file for complete search history.

(56) References Cited

U.S. PATENT DOCUMENTS

| 3,982,600 | A |   | 9/1976  | Gerresheim et al. |
| 4,071,009 | A |   | 1/1978  | Kraina |
| 4,269,287 | A | * | 5/1981  | Rosch ..................... F02B 77/13 188/322.5 |
| 4,456,092 | A | * | 6/1984  | Kubozuka ............... F02B 77/13 181/204 |
| 4,503,931 | A | * | 3/1985  | Sugimoto ............... F02B 77/13 123/198 E |
| 4,782,913 | A | * | 11/1988 | Hoffmann ........... B60R 13/0838 181/286 |

(Continued)

FOREIGN PATENT DOCUMENTS

| DE | 3636934 A1 | 5/1988 |
| DE | 19959089 A1 | 7/2001 |

(Continued)

OTHER PUBLICATIONS

Combined Search and Examination Report under Sections 17 and 18(3) for Application No. GB1707318.0 dated Oct. 20, 2017.

*Primary Examiner* — Gregory A Blankenship
(74) *Attorney, Agent, or Firm* — Carlson, Gaskey & Olds (57) ABSTRACT

A thermal encapsulation apparatus for reducing heat loss from a vehicle component includes an insulating layer which, together with a surface of the component, forms a cavity between them. The apparatus also includes at least one baffle located within the cavity so as to define at least one cell therein. Within the cell, a convective-driven airflow caused by a temperature gradient between the surface of the component and the insulating layer is recirculated. The apparatus allows the component to store heat when it is not operational so that upon restarting the component, e.g. the vehicle engine, there is reduced friction in the moving parts, particularly in relatively cool ambient temperatures.

22 Claims, 9 Drawing Sheets

(56) References Cited

U.S. PATENT DOCUMENTS

| | | | | |
|---|---|---|---|---|
| 2006/0151222 | A1* | 7/2006 | Tinti | B60R 13/0838 180/69.22 |
| 2008/0054231 | A1* | 3/2008 | Wenstrup | A47C 27/121 252/608 |
| 2012/0315159 | A1* | 12/2012 | Fisk | B60R 13/0838 417/231 |
| 2014/0054105 | A1* | 2/2014 | Glav | B60R 13/0838 181/204 |
| 2015/0075482 | A1* | 3/2015 | Kondo | F16B 5/0664 123/198 E |
| 2015/0352950 | A1* | 12/2015 | DeTuncq | B60K 25/00 181/198 |
| 2016/0076443 | A1* | 3/2016 | Sei | B60R 13/0838 123/198 E |
| 2016/0102630 | A1* | 4/2016 | Kondo | B60R 13/0838 123/198 E |
| 2018/0003108 | A1* | 1/2018 | Fujimura | F02B 77/11 |
| 2018/0319353 | A1* | 11/2018 | Chandler | B60R 13/0861 |
| 2018/0354429 | A1* | 12/2018 | Waxin | B60R 13/0838 |
| 2018/0374467 | A1* | 12/2018 | Tomiyama | G10K 11/162 |
| 2019/0256014 | A1* | 8/2019 | Bathelier | B32B 27/12 |
| 2019/0275962 | A1* | 9/2019 | Yamashita | B60R 13/07 |

FOREIGN PATENT DOCUMENTS

| | | |
|---|---|---|
| DE | 602005002961 T2 | 8/2008 |
| JP | 2004211658 A | 7/2004 |

* cited by examiner

THERMAL ENCAPSULATION APPARATUS

CROSS-REFERENCE TO RELATED APPLICATIONS

This application claims priority to United Kingdom application serial number GB1707318.0, which was filed on May 8, 2017.

TECHNICAL FIELD

The present disclosure relates to a thermal encapsulation apparatus and particularly, but not exclusively, to an apparatus for reducing heat loss, and optionally radiated noise, from a vehicle component. Aspects of the invention relate to a thermal encapsulation apparatus, to a vehicle component, and to a vehicle.

BACKGROUND

The moving parts of an engine, transmission, or other component of a vehicle, such as a car, need to be lubricated with a lubricant such as oil to reduce friction between the moving parts and thus reduce the amount of work needed to keep the component operational. The amount of friction in such a component is largely dependent on the lubrication system, the choice of lubricant, and the lubricant temperature. In particular, the viscosity of a lubricant tends to decrease as its temperature rises, resulting in reduced friction, and so it is desirable that the lubricant is kept at a relatively high temperature during use.

During shutdown periods when a vehicle component is not operational, heat in the component and lubricant is dissipated to the surroundings. Therefore, when the vehicle is started and the component becomes operational once more, there is an increased frictional load for the component's moving parts to overcome until the lubricant is heated back to an optimal operating temperature. Efforts have therefore been made to reduce the amount of heat loss to the surroundings during vehicle shutdown.

It is known to provide insulation on a vehicle component or other part of the vehicle to try to retain heat within the component and lubricant during vehicle shutdown periods so that any subsequent restart of the vehicle is more efficient because of reduced friction. For example, insulation panels or an insulating layer may be shaped to correspond to an exterior surface of a vehicle component and then applied directly to the surface. This type of insulation may generally be termed 'component-mounted': for example, if the insulation panels are applied to an engine exterior surface then this is termed 'engine-mounted'. As the arrangements of such components may be of relatively complex shape, this can make manufacturing such engine-mounted insulation relatively difficult and expensive, and may compromise the heat retention and noise attenuation functionality of the insulation. Alternatively, insulation may be applied at a distance from an exterior vehicle component, for example on a bonnet liner, side panel, undertray or active grille shutter of the vehicle body, and this is termed 'body-mounted' insulation. This type of insulation is disadvantageous in that it can be challenging to maintain adequate sealing to guard against leakage via gaps in the vehicle body and the need to deal with dispersion of heat throughout the area in the vicinity of a component, for example throughout an engine compartment.

It is an aim of the present invention to address disadvantages associated with the prior art.

SUMMARY

According to an aspect of the present invention there is provided a thermal encapsulation apparatus for reducing heat loss from a vehicle component. The apparatus comprises an insulating layer which, together with a surface of the component, forms a cavity between them. At least one baffle is located within the cavity so as to define at least one cell in the cavity. A convective-driven airflow caused by a temperature gradient between the component surface and the insulating layer is recirculated within the cell.

The apparatus allows the component to store heat when it is not operational so that upon restarting the component, e.g. the vehicle engine, there is reduced friction in the moving parts, particularly in relatively cool ambient temperatures. The at least one baffle acts to disrupt convective-driven or buoyancy-driven flow in the cavity, and therefore reduce or eliminate heat loss via a gap in the cavity. In particular, the at least one baffle imposes a pressure drop onto the convective-driven airflow to reduce the flow rate of air and hence the mixing rate of relatively warm air with relatively cool air.

The vehicle component may be an engine, a transmission, another component located within a vehicle engine bay, or any other component where reduced heat loss may be beneficial. For example, if the component is a vehicle engine, then this apparatus allows convective flows to be influenced such that upon restarting the engine after a period of non-operation, e.g. 9 to 12 hours, the engine structure and associated lubricants are still relatively warm so as to allow a more efficient restart. This can lead to increased fuel economy and/or reduced carbon dioxide emissions of the vehicle. The vehicle may be a land vehicle, such as a car, or alternatively may be an aircraft, ship, or any other type of suitable vehicle.

The insulating layer is positioned adjacent to the component surface such that a cavity is formed between them. A portion of the insulating layer may be in contact with at least part of the surface; however, this need not be the case.

In one embodiment, at least a portion of the insulating layer is positioned adjacent to a side surface of the component.

The at least one baffle may be attached to, and extend from, the insulating layer.

The insulating layer and the at least one baffle may be formed of a single piece.

The at least one baffle may be attached to, and extend from, the surface of the component. The at least one baffle may comprise a flange portion adjacent to the surface of the component. The at least one baffle may be attachable to the surface of the component via fastening means through an aperture in the flange portion.

In some embodiments the at least one baffle forms an acute angle with at least one of the insulation layer and the surface of the component. This can reduce the noise emanating from the vehicle component during use to the surroundings, e.g. the vehicle cabin, as the sound waves may need to travel through a baffle and the insulating layer before reaching the surrounding, thus increasing noise absorption.

In some embodiments at least a portion of the insulation layer is formed of the same material as the at least one baffle.

The at least one baffle may be formed of an impermeable material. The at least one baffle may include at least one aperture to allow airflow therethrough. This guards against significant pressure differences between adjacent cells developing.

In some embodiments the at least one baffle is formed of porous material. This is an alternative way to ensure there is at least some communication of air between adjacent cells. In such embodiments the at least one baffle may be formed of one or more of foam, gauze, mesh, and felt. It may be that at least a portion of the insulating layer is formed of a porous material.

The insulating layer may comprise at least one cooling air inlet and at least one cooling air outlet on an opposite side of the insulating layer. This allows effective cooling of the component during normal operation of the vehicle.

The component may be one of an engine and a transmission.

According to another aspect of the invention there is provided a vehicle component comprising a thermal encapsulation apparatus for reducing heat loss from the vehicle component, the thermal encapsulation apparatus comprising an insulating layer, the insulating layer and a surface of the component forming a cavity therebetween, and at least one baffle located within the cavity so as to define at least one cell therein. Within the cell, convective-driven airflow caused by a temperature gradient between the component surface and the insulating layer is recirculated.

An opening may be formed at a lower part of the cavity.

The at least one baffle may be attached to the insulating layer and abuts the surface of the component.

The at least one baffle may be attached to the surface of the component and abuts the insulating layer.

In some embodiments a longitudinal axis of the at least one baffle substantially coincides with a cooling air direction of the vehicle. This allows effective cooling of the component when the vehicle is moving.

The thermal encapsulation apparatus may be mounted to the component. It may be that at least a portion of the insulating layer is mounted to a side surface of the component.

According to another aspect of the invention there is provided a vehicle including the thermal encapsulation apparatus as described above or including the vehicle component as described above.

The thermal encapsulation apparatus may be mounted to the vehicle body. It may be that at least a portion of the insulating layer is mounted to a wheel arch and/or a wheel arch liner of the vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
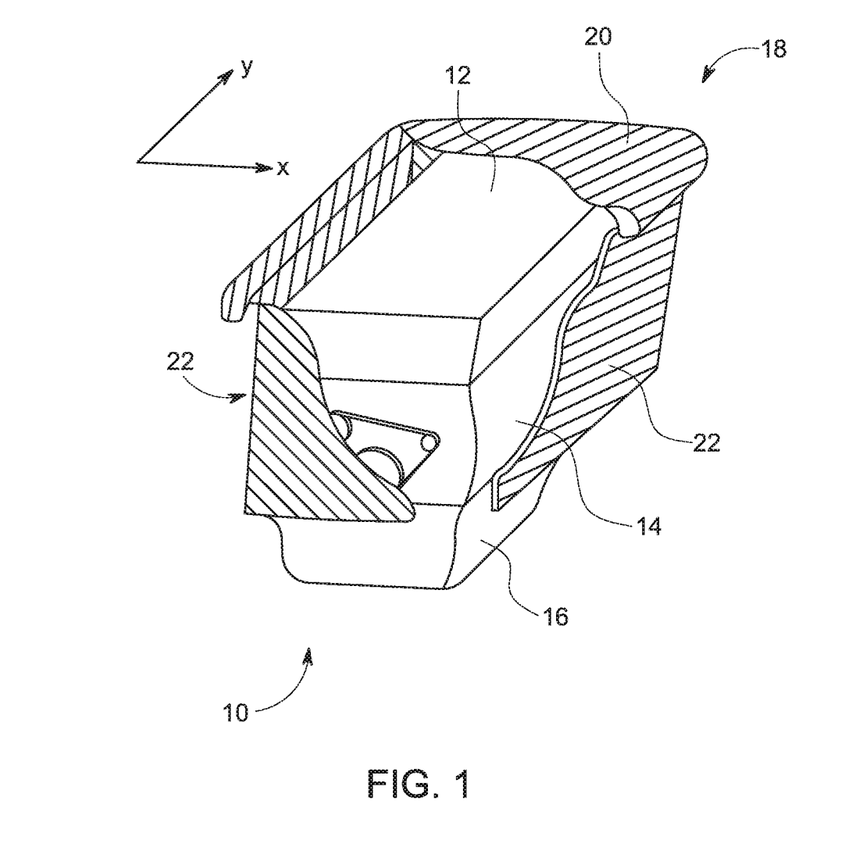
FIG. 1 shows a vehicle engine and a thermal encapsulation apparatus according to an embodiment of the invention, the apparatus including an insulating layer covering the engine and at least one baffle (not shown), where a section of the insulating layer has been cut away for clarity.

FIG. 1 shows an engine 10 for a vehicle such as a car, the engine 10 having a cylinder head 12, an engine block 14, and a sump 16. The block 14 is located below the cylinder head 12, and the block 14 and cylinder head 12 have substantially equal width in an x-direction. The sump 16 is located below the block 14 and tapers to a width less than that of the block 14.

The engine 10 is covered by an insulating layer 18 having an insulated top cover 20 and insulated side panels 22 (only one of which is visible in FIG. 1). The top cover 20 rests on a top part of the cylinder head 12 and the side panels 22 hang from the top cover 20, and are adjacent to side parts of the cylinder head 12 and engine block 14. One or more baffles or flow restrictors (not shown in FIG. 1) extend inwardly from the insulating layer 18 towards the engine 10. This will be described in greater detail below.

Figure 2:
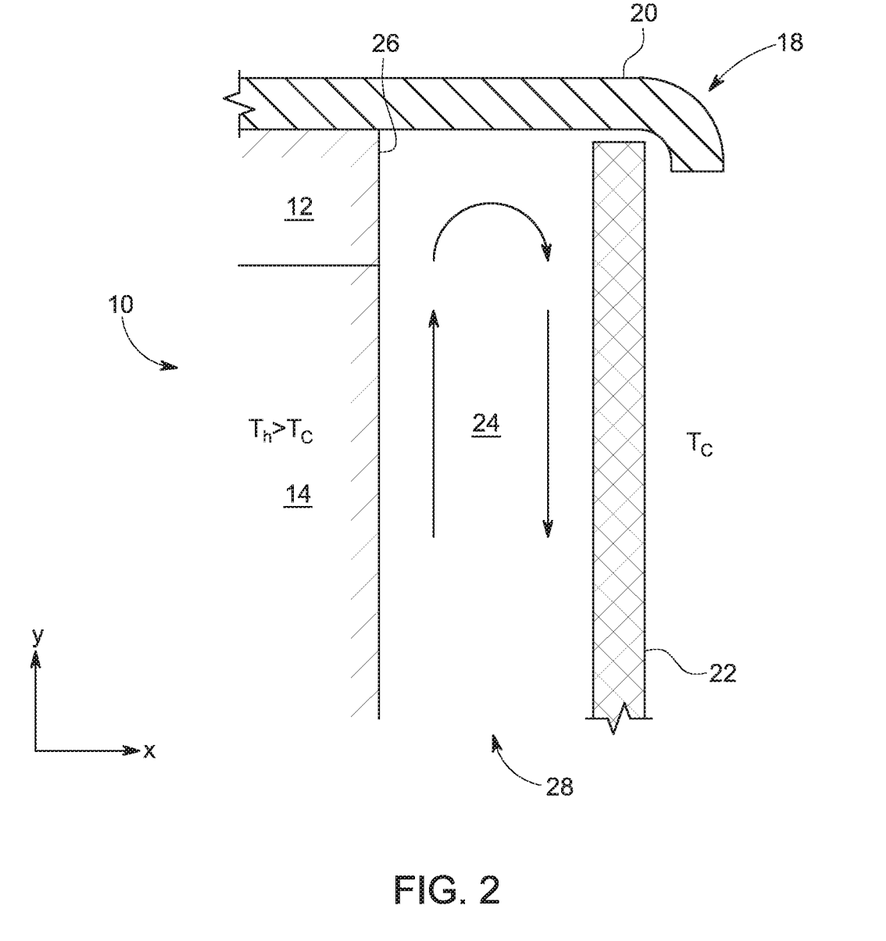
FIG. 2 shows a cross section of the engine and thermal encapsulation apparatus of FIG. 1 in the absence of the at least one baffle so as to show a direction of airflow caused by a temperature gradient between an exterior surface of the engine and the insulating layer in the absence of said baffle.

FIG. 2 shows a cross section of the engine 10 and insulating panel layer 18, but not showing the one or more baffles. The insulating layer 18 is relatively 'loose-fitting' meaning that a cavity 24 is formed by an exterior side surface 26 of the cylinder head 12 and engine block 14 of the engine 10, the top cover 20 of the insulating layer 18, and the side panel 22 of the insulating layer 18. Loose fitting panels such as this allow more complete coverage of the engine surface. The panels may have a thickness between 2 to 20 mm, typically 2 to 5 mm or 15 to 20 mm. A gap or opening 28 is formed between the side panel 22 and the block 14 at the lower part of the block 14. In the presently described embodiment, the cavity 24 is substantially vertical; however, the cavity may be at an angle to the vertical depending on the contours of the exterior of the engine under consideration.

The temperature Tc of the air on the side of the side panel 22 opposite the cavity 24, e.g. in an engine compartment of the vehicle, is relatively cool, possibly at or above ambient temperature. During operation of the engine 10, the temperature Th of the exterior side surface 26 is relatively warm and, in particular, at a temperature greater than Tc. Therefore, there exists a temperature gradient from Th at the side surface 26 to Tc at the side panel 22. In addition, as the lower part of the cavity 24 is open to the relatively cool, dense air of the engine compartment, then the air at the lower part of the cavity 24 is at a temperature lower than the relatively warm, less dense air of the upper part of the cavity 24 near to the top cover 20. This temperature gradient causes convective-driven flow of the air in the cavity 24. In particular, the relatively warm air adjacent to, and warmed by, the engine surface 26 will tend to rise in a y-direction (which is opposite to a gravitational direction) towards the insulating layer top surface 20. In turn, this will force air positioned adjacent to the top cover 20 downwards through the other side of the cavity 24, i.e. adjacent to the insulating layer side surface 22, and out of the gap 28 in the lower part of the cavity 24. This convective-driven flow means that heat transferred from the engine 10 to the air in the cavity 24 is lost to the surroundings, as shown by the arrows in FIG. 2.

Figure 3:
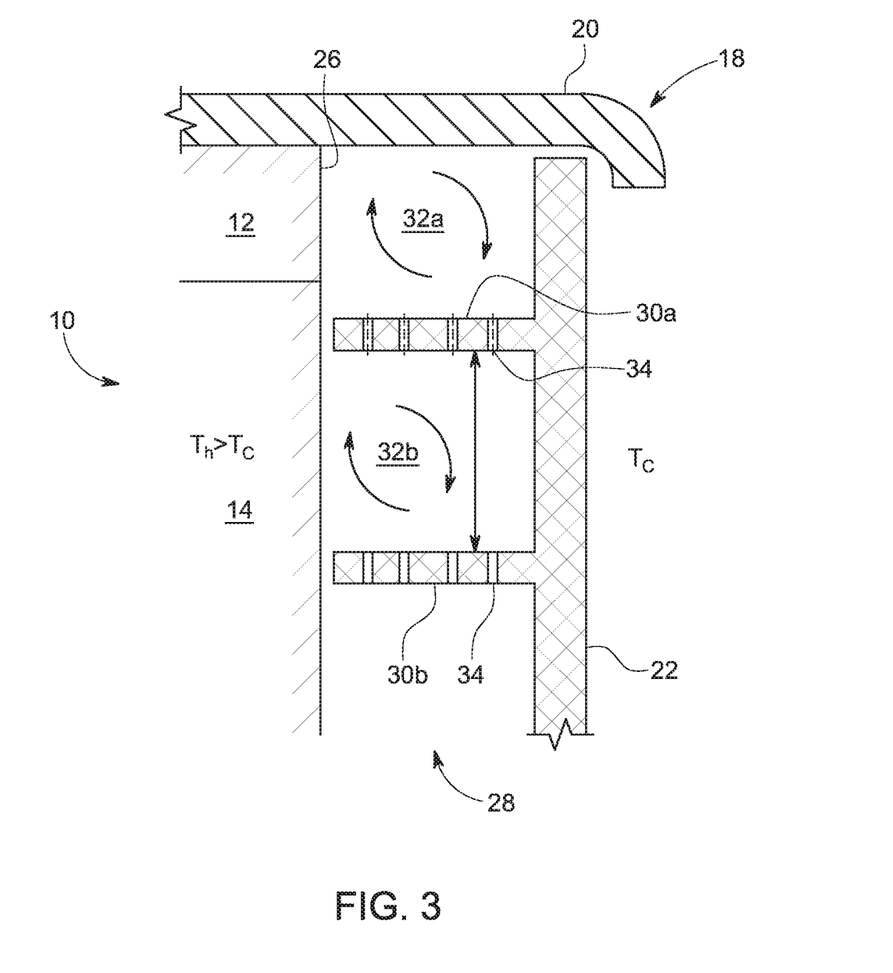
FIG. 3 shows the view of FIG. 2, additionally showing two baffles extending substantially perpendicularly from the insulating layer.

FIG. 3 shows the view of FIG. 2, and additionally shows upper and lower baffles, labelled 30a and 30b respectively, extending substantially perpendicularly from the insulating layer side surface 22 towards the engine surface 26. The baffles 30a, 30b are formed of the same impermeable material as the insulating layer 18, that is, air does not flow through the baffle material. The baffles 30a, 30b are positioned such that the cavity 24 is divided into upper and lower cells, labelled 32a and 32b respectively. The upper cell 32a is defined between the top cover 20 and the upper baffle 30a and the lower cell 32b is defined between the upper and lower baffles 30a, 30b. As seen in FIG. 3, the cells 32a, 32b are of substantially equal cross-sectional area and substantially equal volume; however, this need not be the case. The baffles 30a, 30b extend fully across the gap 28 and abut the side surface 26 in the presently described embodiment.

Each of the baffles 30a, 30b has baffle apertures 34 which allow fluid communication between the cells 32a, 32b. In the described embodiment, the upper baffle 30a has four apertures 34 and the lower baffle 30b has three apertures 34; however, any suitable number of apertures may be used. The apertures 34 are in the form of holes inserted through the baffle material. As air may flow between the cells 32a, 32b then this may help to guard against decompression of the cells 32a, 32b caused by pressure differences that may build up between the inside of and the outside of the cavity 24. However, the apertures 34 are small enough such that only a relatively insignificant amount of heat is lost to the surroundings via air flowing through the apertures 34 and out of the gap 28 in the cavity 24 and, in particular, the flow of air within the cavity 24 is influenced such that the flow rate of air is reduced. This results from the temperature gradient within one of the cells 32a, 32b being smaller than in the cavity 24 in the absence of baffles.

Unlike in the case shown in FIG. 2, the arrows in FIG. 3 show that air adjacent to, and warmed by, the engine surface 26 is not lost to the surroundings via the gap 28, but rather the air is recirculated around the cells 32a, 32b (still driven by the temperature difference between the engine surface 26 and the insulating layer 22). As mentioned above, as the temperature gradient within each cell 32a, 32b is less than the temperature gradient within the whole cavity 24 without baffles then the rate of airflow within the cells 32a, 32b as shown in FIG. 3 is less than the rate of airflow within the cavity 24 as shown in FIG. 2. Expressed differently, splitting the cavity 24 into a plurality of cells 32a, 32b reduces the recirculating flows because of the reduced vertical height and temperature difference within each cell which, in addition to flow restriction, reduces the propensity for convective-driven flows to become established.

Figure 4:
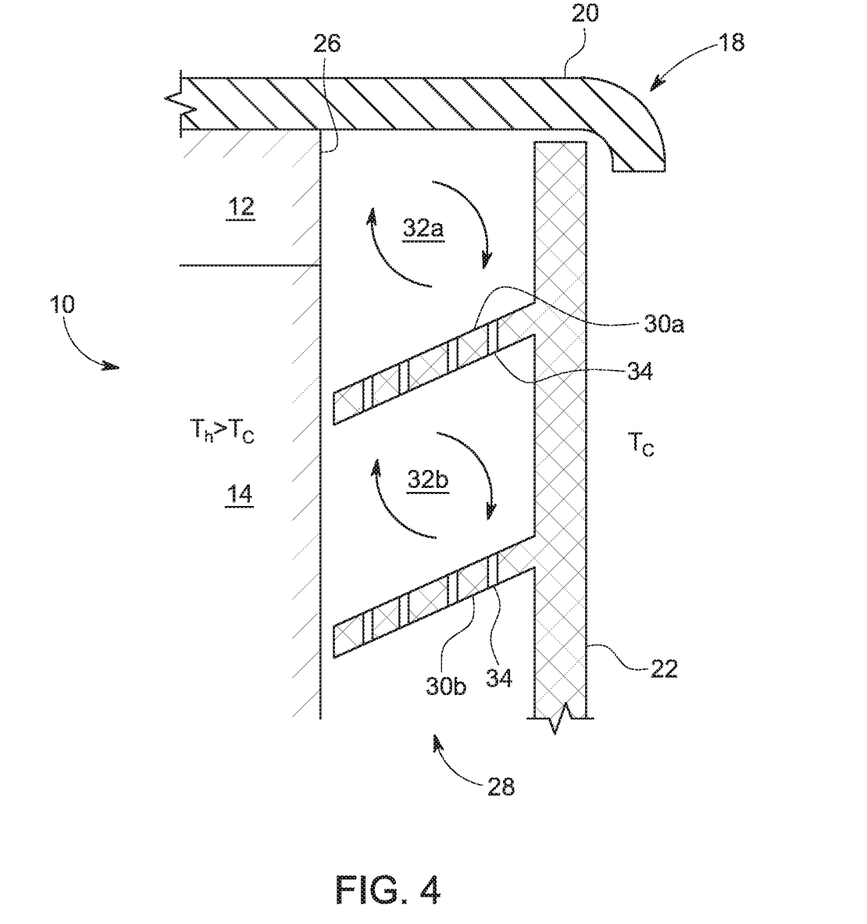
FIG. 4 shows the view of FIG. 3 but in an alternative embodiment with the baffles extending downwards from the insulating layer, the baffles forming an acute angle with the insulating layer.
Figure 5:
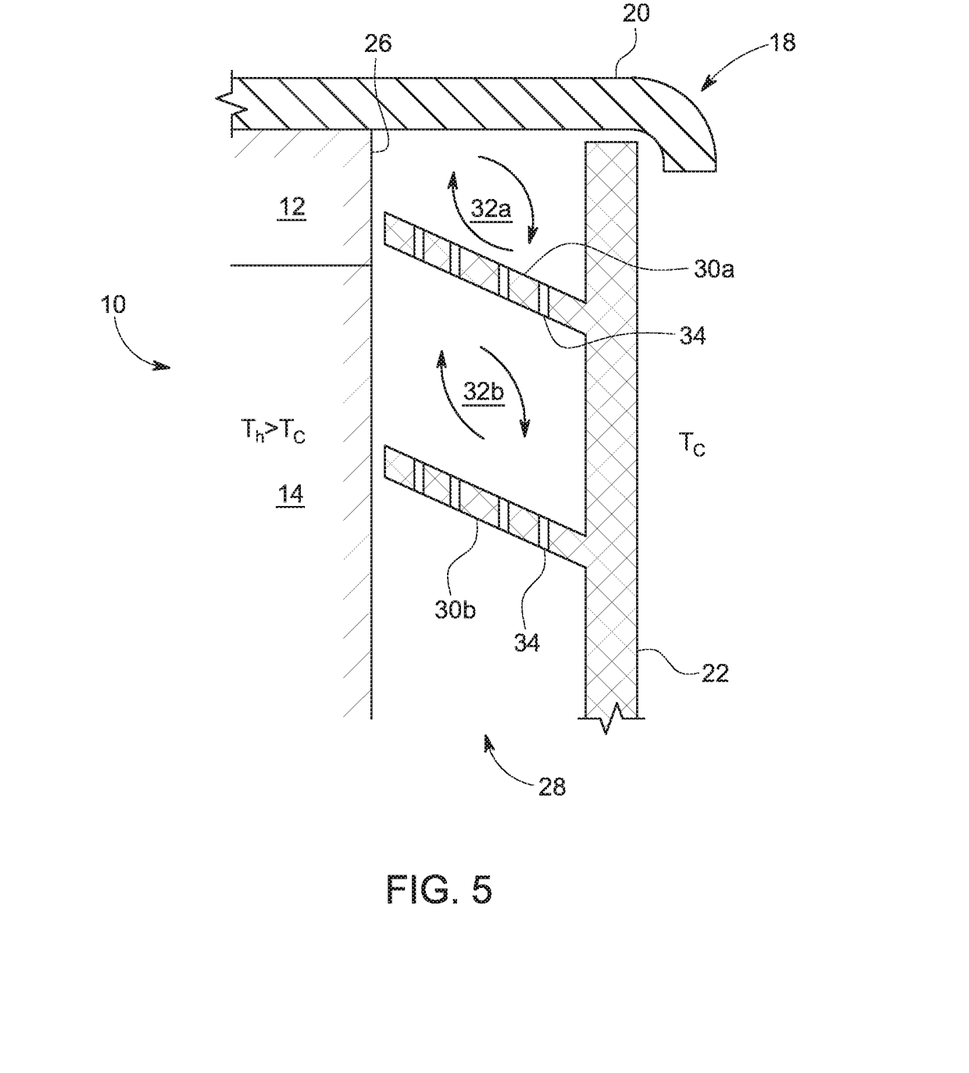
FIG. 5 shows the view of FIG. 3 but in an alternative embodiment with the baffles extending upwards from the insulating layer, the baffles forming an acute angle with the insulating layer.

FIGS. 4 and 5 show alternative embodiments in which the baffles 30a, 30b extend in downward and upward directions, respectively, from the insulating layer side surface 22 such that the baffles 30a, 30b form an oblique angle with the side surface 22, which angle is acute on one side of the baffles 30a, 30b. The volumes of the cells 32a, 32b are therefore different in each case. These particular configurations may be beneficial from a noise attenuation point of view. In particular, sound waves as a result of noise emanating from the engine 10 through the insulating layer side surface 22 will additionally need to travel through one of the inclined insulating baffles 30a, 30b, thus providing additional noise dampening before reaching the engine compartment. In addition, as the inclined baffles 30a, 30b increase the effective thickness of the insulation they provide a more tortuous path for heat to escape from the relatively warm engine surface 26 to the ambient environment.

Figure 6:
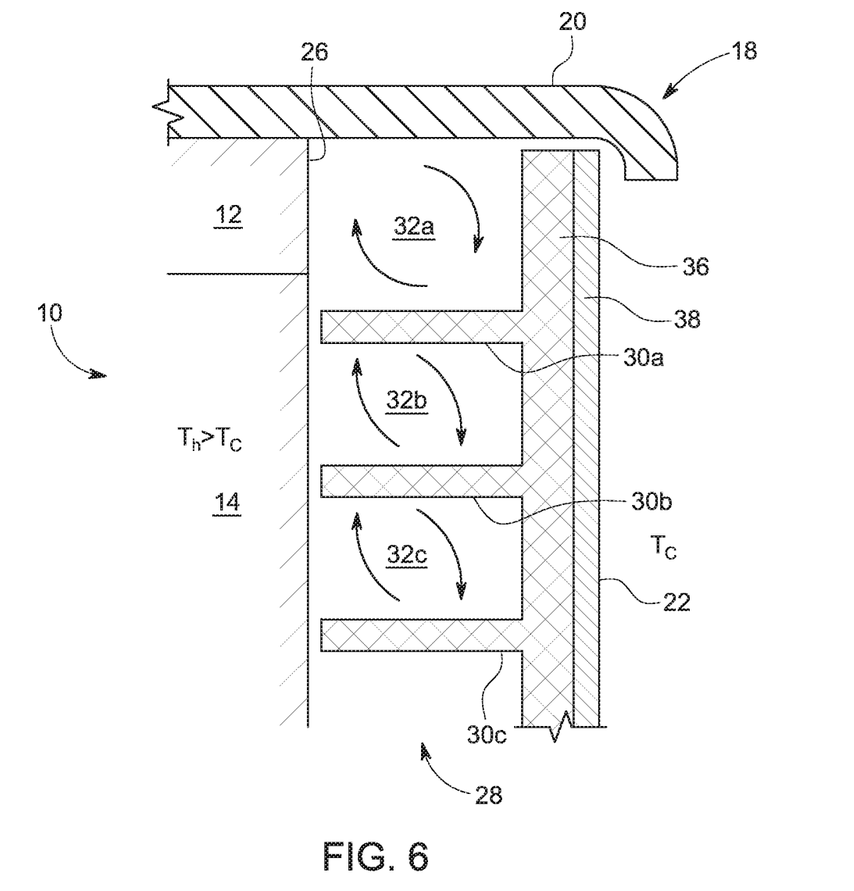
FIG. 6 shows the view of FIG. 2, but in an alternative embodiment in which three baffles extend from the insulating layer, the baffles and a portion of the insulating layer being formed of a porous material.

FIG. 6 shows an alternative embodiment in which three baffles 30a, 30b, 30c are provided instead of two. Each of the three baffles 30a, 30b, 30c is formed of a porous or fibrous material, rather than an impermeable material. In the described embodiment, an inner portion 36 of the insulating panel layer side panel 22 is also formed of the porous material and an outer portion 38 of the insulating layer side panel 22 is formed of an impermeable material. The porous material may be at least one of foam, gauze, mesh or felt.

Figure 7:
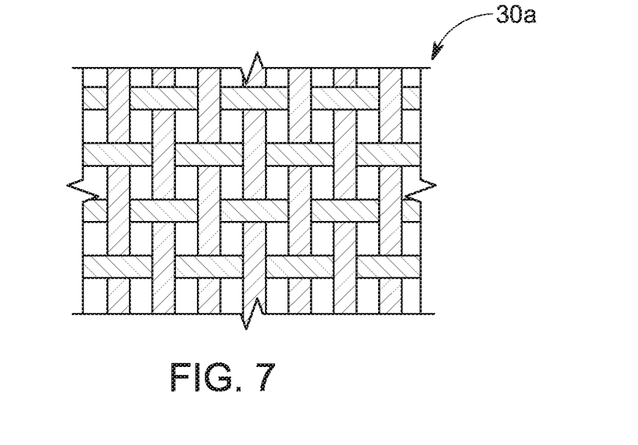
FIG. 7 shows a plan view of a section of the porous material used to form the baffles of FIG. 6.

FIG. 7 shows a plan view of a section of the baffle 30a in FIG. 6, and shows the woven pattern of fibres forming the porous material with relatively small gaps formed between the fibres to allow air to flow through. The gaps may be sized to allow the desired amount of air through the gaps, i.e. the porous material may be manufactured with an air flow permeability tailored to a desired value.

Figure 8:
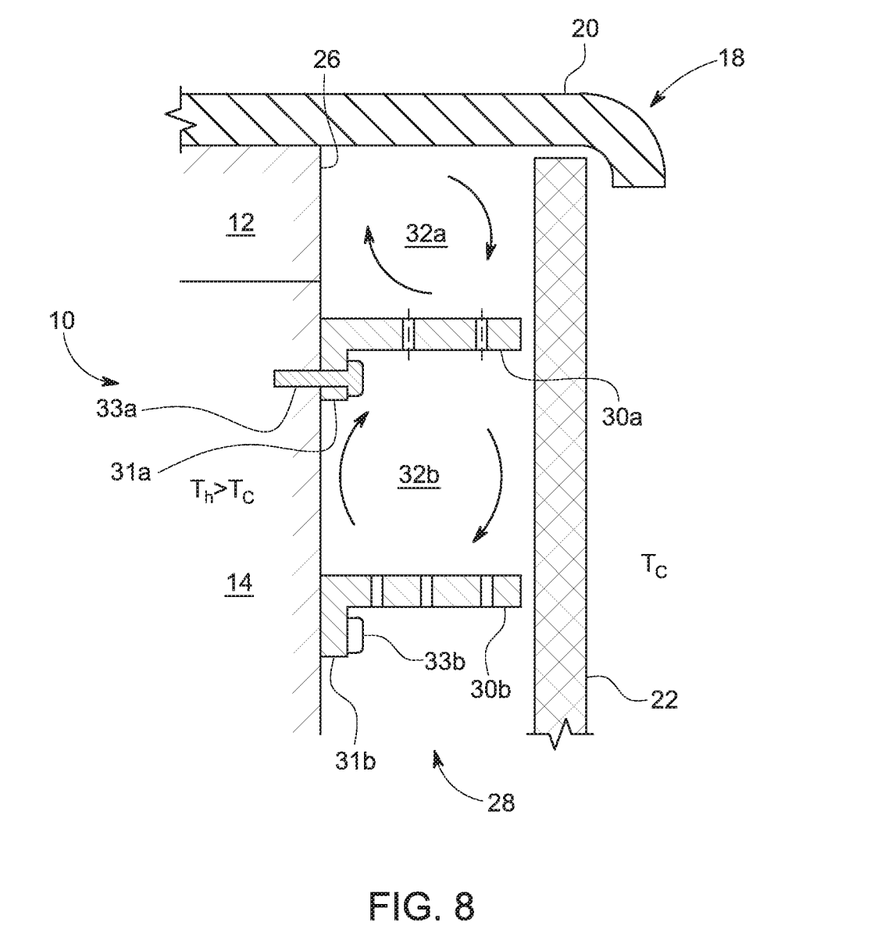
FIG. 8 shows the view of FIG. 3, but in an alternative embodiment with the baffles extending substantially perpendicularly between the engine surface and the insulating layer, the baffles being attached to the engine surface.

FIG. 8 shows an alternative embodiment in which the baffles 30a, 30b are not attached to the insulating layer side surface 22 but are instead attached to, and extend from, the engine surface 26 into the cavity 24 to form the cells 32a, 32b. The baffles 30a, 30b may be attached to the engine surface in any suitable way. In the described embodiment, each baffle 30a, 30b has a flange 31a, 31b that abuts the engine surface 26, the baffle 30a, 30b being mounted to the engine surface 26 by a bolt 33a, 33b extending through the baffle 30a, 30b into the engine. Any other suitable fastening means may be used. The mounting points in the engine surface 26 through which the bolts 33a, 33b enter may be formed specifically to attach the baffles 30a, 30b or may be existing ancillary mounting points. The ends of the baffles 30a, 30b adjacent the insulating layer side surface 22 abut the side surface 22.

Figure 9:
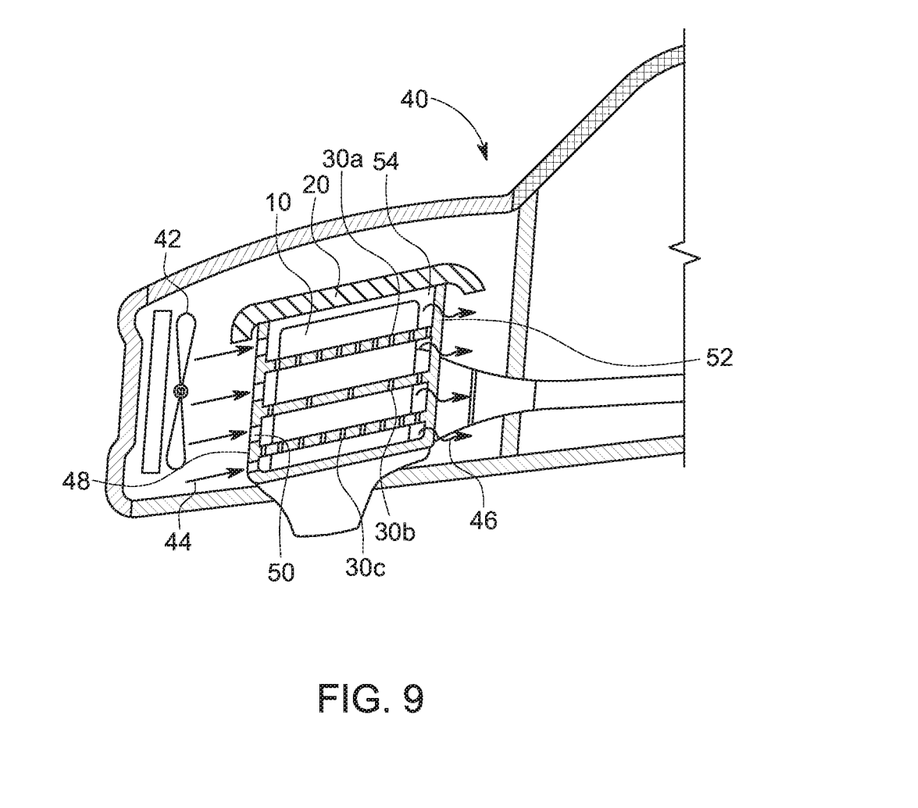
FIG. 9 shows a cross sectional side view of a vehicle with the engine and thermal encapsulation apparatus of FIG. 1.

FIG. 9 shows a cross sectional side view of a vehicle 40, showing the engine 10, the insulating layer top cover 20 and three baffles 30a, 30b, 30c. Note that the insulating layer side panels 22 are not shown in FIG. 8. The vehicle 40 includes a cooling fan 42 located upstream of the engine 10 to provide cooling air to the engine 10 during operation. The arrows 44, 46 show the direction of flow of the cooling air into, through, and out of the thermal encapsulation apparatus. In particular, a front panel 48 of the insulating layer 18 includes cooling air inlets 50 to allow cooling air 44 from the cooling fan 42 to pass through the otherwise impermeable insulating layer 18 so that the engine is supplied with cooling air for effective cooling during operation. In turn, a rear panel 52 of the insulating layer 18 includes cooling air outlets 54 to allow the cooling air to be vented back through the insulating layer 18. The number of cooling air inlets 50 and outlets 54 may be chosen to optimise the effectiveness of engine cooling. It is seen that a longitudinal axis of the baffles 30a, 30b, 30c, i.e. from the front to the rear of the vehicle 40 or in the direction of vehicle motion, substantially coincides with the cooling air direction 44, 46 of the vehicle 10 so that the flow of cooling air is not obstructed or restricted by the baffles 30a, 30b, 30c. This arrangement allows effective cooling of the engine 10 during vehicle operation and also effective heat retention within the engine 10 and associated lubrication system during vehicle shutdown.

Figure 10:
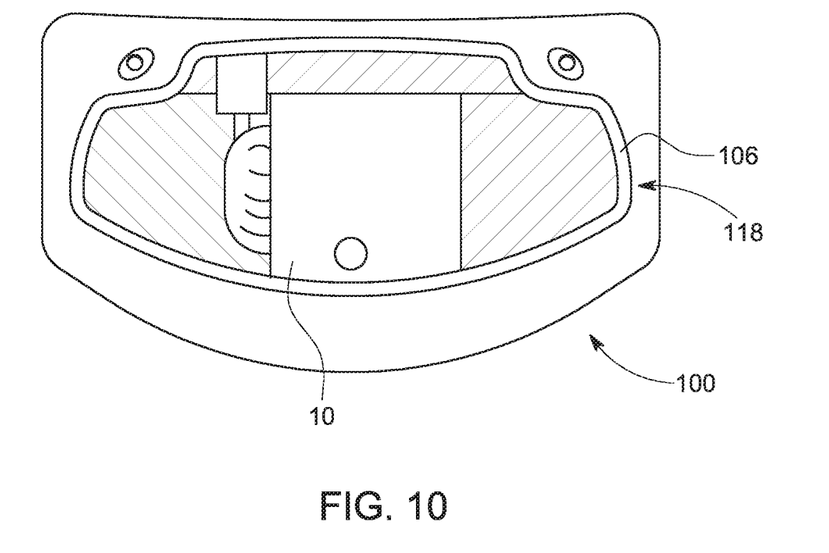
FIG. 10 shows a top view of a vehicle engine compartment including an engine and a thermal encapsulation apparatus according to another embodiment of the invention, the apparatus including an insulating layer mounted to the vehicle body and at least one baffle (not shown)
Figure 11:
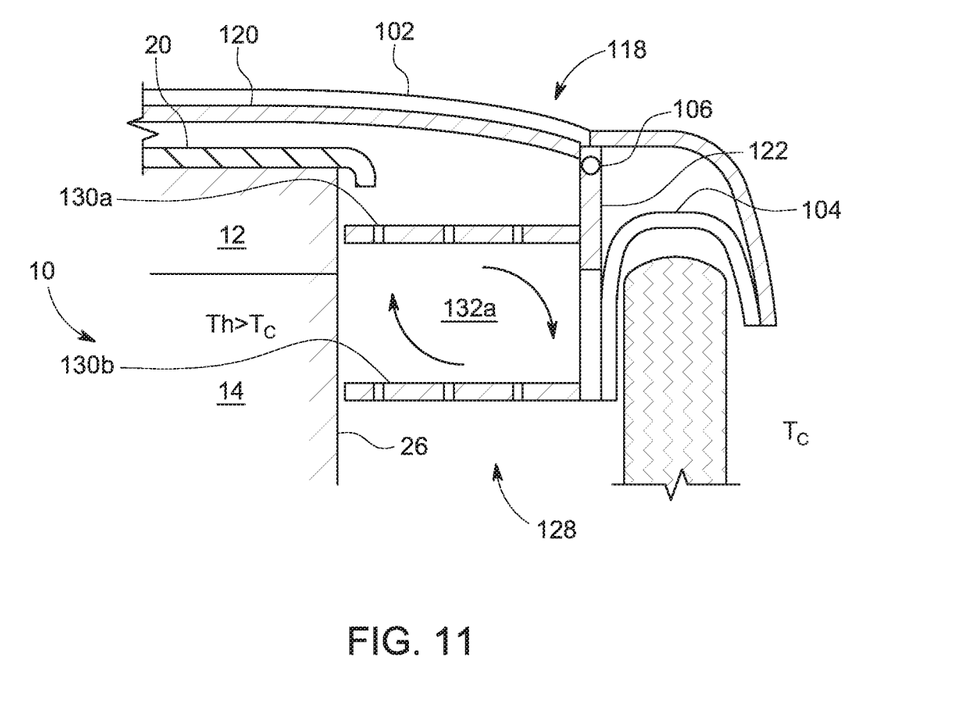
FIG. 11 shows a cross section of the engine and thermal encapsulation apparatus of FIG. 10 with two baffles extending substantially perpendicularly from the insulating layer.

FIGS. 10 and 11 show an arrangement according to another embodiment of the invention. In particular, FIG. 10 shows a top view of a vehicle engine compartment 100 including the engine 10. The vehicle bonnet 102 is not shown in FIG. 10 but is shown in FIG. 11. Like in the embodiments described in FIGS. 1 to 9, there is an engine-mounted insulating top cover 20; however, unlike in those embodiments there is no engine-mounted insulating side panels 22 (only one of which is shown). Also unlike the previously-described embodiments, there is provided a body-mounted insulating layer 118 having an insulated top cover 120 and insulated side panels 122. In particular, the top cover 120 is attached to the bonnet 102 and the side panel 122 is attached to a side part of the vehicle body, in this case a wheel arch 104 (or wheel arch liner). The top cover or bonnet liner 120 includes a bonnet liner seal 106 to guard against heat loss to the surroundings through insulation gaps.

There is a cavity formed between the engine side surface 26 and the insulating side panel 122, the cavity having an open end 128 at its lower part that allows air to flow in and out of the cavity. Two baffles 130a, 130b extend substantially perpendicularly from the insulating side panel 22 towards the engine side surface 26. The baffles 130a, 130b form a cell 132a within the cavity.

Similarly to the embodiments described with reference to FIGS. 1 to 9, the temperature Tc of the air on the side of the side panel 122 opposite the cavity, e.g. outside the vehicle, is cooler than the temperature Th of the engine surface 26 during engine operation. As previously described, this temperature gradient causes convective-driven flow within the cavity and the baffles 130a, 130b act to circulate the flow within the cell 132a so as to reduce the loss of heat to the surroundings via the gap 128. The temperature difference between Th and Tc may be greater in this embodiment than in the previously-described embodiments, and so the convective-driven flow of air may be faster in this embodiment.

In the described embodiments, the baffles 30a, 30b abut the engine surface 26 or the insulating layer side surface 22. In other embodiments, however, there may be a gap between the baffles and the engine surface such that air may flow between them.

In the described embodiments, the baffles 30a, 30b are substantially parallel to one another; however, in other embodiments this need not be the case.

In the described embodiments, air may flow between the cells 32a, 32b through apertures 34 or through porous baffle material; however, in different embodiments there may be no air flow through the baffles, i.e. the baffles are completely solid.

In the described embodiments, the baffles 30a, 30b are attached to either the insulating layer or to the component; however, in different embodiments the baffles 30a, 30b may be attached to both the insulating layer and component.

It is to be understood that the baffles may be of any suitable shape and are not limited to those shapes shown in the accompanying figures. For example, the cross-sectional shape of the baffles may be curved rather than planar or flat.

Many modifications may be made to the above examples without departing from the scope of the present invention as defined in the accompanying claims.

The invention claimed is:

1. A thermal encapsulation apparatus for reducing heat loss from a vehicle component, the apparatus comprising:
   an insulating layer which, together with a surface of the component, forms a cavity between the insulating layer and the surface of the component; and,
   at least one baffle located within the cavity so as to divide the cavity into at least two cells, wherein, within each cell, a convective-driven airflow caused by a temperature gradient between the surface of the component and the insulating layer is recirculated,
   wherein an opening is formed at a lower part of the cavity.

2. A thermal encapsulation apparatus according to claim 1, wherein the at least one baffle is attached to, and extending from, the insulating layer.

3. A thermal encapsulation apparatus according to claim 2, wherein the insulating layer and the at least one baffle are formed of a single piece.

4. A thermal encapsulation apparatus according to claim 1, wherein the at least one baffle is attached to, and extending from, the surface of the component.

5. A thermal encapsulation apparatus according to claim 4, wherein the at least one baffle comprises a flange portion adjacent to the surface of the component.

6. A thermal encapsulation apparatus according to claim 5, wherein the at least one baffle is attachable to the surface of the component by a fastener received at least partially through a flange aperture in the flange portion.

7. A thermal encapsulation apparatus according to claim 1, wherein the at least one baffle forms an oblique angle with at least one of the insulation layer and the surface of the component.

8. A thermal encapsulation apparatus according claim 1, wherein at least a portion of the insulation layer is formed of the same material as the at least one baffle.

9. A thermal encapsulation apparatus according to claim 1, wherein the at least one baffle is formed of an impermeable material.

10. A thermal encapsulation apparatus according to claim 9, wherein the at least one baffle includes at least one baffle aperture to allow airflow through the at least one baffle aperture.

11. A thermal encapsulation apparatus according to claim 1, wherein the at least one baffle is formed of porous material.

12. A thermal encapsulation apparatus according to claim 11, wherein the at least one baffle is formed of at least one of foam, gauze, mesh, and felt.

13. A thermal encapsulation apparatus according to claim 11, wherein at least a portion of the insulating layer is formed of a porous material.

14. A thermal encapsulation apparatus according to claim 1, wherein the insulating layer comprises at least one cooling air inlet on one side of the insulating layer and at least one cooling air outlet on an opposite side of the insulating layer.

15. A vehicle comprising:
an engine;
a transmission; and
the thermal encapsulation apparatus according to claim 1, and
wherein the component is at least one of the engine and the transmission.

16. A vehicle component comprising
a component surface;
a thermal encapsulation apparatus including an insulating layer situated to form a cavity between the insulating layer and the component surface; and
at least one baffle located within the cavity so as to divide the cavity into at least two cells, wherein, within each cell, convective-driven airflow caused by a temperature gradient between the component surface and the insulating layer is recirculated,
wherein an opening is formed at a lower part of the cavity.

17. A vehicle component according to claim 16, wherein a longitudinal axis of the at least one baffle substantially coincides with a cooling air direction of the vehicle component.

18. A vehicle component according to claim 16, wherein the thermal encapsulation apparatus is mounted to the component.

19. A vehicle component according to claim 18, wherein at least a portion of the insulating layer is mounted to a side surface of the component.

20. A vehicle including the vehicle component of claim 16.

21. A vehicle according to claim 20, wherein the vehicle comprises a vehicle body and the thermal encapsulation apparatus is mounted to the vehicle body.

22. A vehicle according to claim 21, wherein
the vehicle body includes a wheel arch and a wheel arch liner; and
at least a portion of the insulating layer is mounted to at least one of the wheel arch and the wheel arch liner.

* * * * *